(12) United States Patent
Ou et al.

(10) Patent No.: US 8,156,459 B1
(45) Date of Patent: Apr. 10, 2012

(54) DETECTING DIFFERENCES BETWEEN HIGH LEVEL BLOCK DIAGRAM MODELS

(75) Inventors: Jingzhao Ou, San Jose, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 315 days.

(21) Appl. No.: 12/615,415

(22) Filed: Nov. 10, 2009

(51) Int. Cl.
G06F 17/50 (2006.01)
G06F 9/455 (2006.01)

(52) U.S. Cl. ........ 716/107; 716/102; 716/103; 716/104; 716/106; 716/132; 716/136; 716/139; 703/2; 703/6; 703/7; 703/14

(58) Field of Classification Search ................. 716/102, 716/103, 104, 106, 107, 132, 136, 139
See application file for complete search history.

(56) References Cited

U.S. PATENT DOCUMENTS

| | | | | |
|---|---|---|---|---|
| 5,493,507 A * | 2/1996 | Shinde et al. | | 703/14 |
| 5,995,736 A * | 11/1999 | Aleksic et al. | | 716/103 |
| 6,321,369 B1 * | 11/2001 | Heile et al. | | 716/102 |
| 6,385,617 B1 * | 5/2002 | Malik | | 707/693 |
| 6,848,084 B1 * | 1/2005 | Pandey et al. | | 716/107 |
| 7,007,261 B1 * | 2/2006 | Ballagh et al. | | 716/103 |
| 7,093,224 B2 * | 8/2006 | Wheeler et al. | | 716/102 |
| 7,099,809 B2 * | 8/2006 | Dori | | 703/6 |
| 7,178,112 B1 * | 2/2007 | Ciolfi et al. | | 703/2 |
| 7,194,705 B1 * | 3/2007 | Deepak et al. | | 716/103 |
| 7,222,317 B1 * | 5/2007 | Mathur et al. | | 716/107 |
| 7,346,486 B2 * | 3/2008 | Ivancic et al. | | 703/22 |
| 7,383,166 B2 * | 6/2008 | Ashar et al. | | 703/14 |
| 7,418,680 B2 * | 8/2008 | Clarke et al. | | 716/107 |
| 7,437,700 B2 * | 10/2008 | Wang et al. | | 716/104 |
| 7,480,877 B2 * | 1/2009 | Acuna et al. | | 716/136 |
| 7,523,433 B1 * | 4/2009 | Anderson | | 716/139 |
| 7,539,602 B2 * | 5/2009 | Willis | | 703/2 |
| 7,681,151 B2 * | 3/2010 | Ciolfi et al. | | 716/116 |
| 7,685,545 B2 * | 3/2010 | Chapman et al. | | 716/136 |
| 7,698,668 B2 * | 4/2010 | Balasubramanian et al. | | 716/106 |
| 7,707,014 B2 * | 4/2010 | Kodosky et al. | | 703/2 |
| 7,890,198 B1 * | 2/2011 | Gahinet | | 700/31 |
| 7,974,823 B1 * | 7/2011 | Aldrich | | 703/7 |
| 7,992,111 B1 * | 8/2011 | Ma et al. | | 716/103 |
| 7,996,799 B2 * | 8/2011 | Farkash et al. | | 716/106 |

* cited by examiner

Primary Examiner — Helen Rossoshek
(74) Attorney, Agent, or Firm — LeRoy D. Maunu

(57) ABSTRACT

A method of detecting differences between high level block diagram models using text based analysis. Previous methods of determining differences between high level block diagram models derive differences through traversal of the block hierarchy which is complex and cannot compare differences between models created with third party design environments. The present invention increases interoperability and capabilities of existing circuit design environments, and achieves an advance in the art, by converting high level block diagram models to a user readable text-based format and performing a text-based differential analysis on the converted models to determine differences.

16 Claims, 7 Drawing Sheets

DETECTING DIFFERENCES BETWEEN HIGH LEVEL BLOCK DIAGRAM MODELS

FIELD OF THE INVENTION

The present invention generally relates to tools for creating electronic circuit designs.

BACKGROUND

Electronic circuit designs may be prepared using any of a variety of approaches. In one approach, the designer creates a graphical high level block diagram model of the system using a tool such as the System Generator for DSP from XILINX®, Inc., which enables use of the SIMULINK® model-based environment from The MATHWORKS®. These types of tools provide a graphical user interface (GUI) for preparing, simulating, and even implementing a circuit design. Basic building blocks are instantiated, connected, and combined into larger blocks of the design via the GUI. Each block generally has at least one input signal, at least one output signal, and an equation that defines the relationship between the input and output signals.

In another approach, a design can be specified in a hardware description language (HDL) such as VHDL or Verilog. In an HDL approach the designer has a greater level of control over the eventual implementation. However, when using an HDL the designer may sacrifice the benefits associated with the ability to abstract the design at a high level as provided by a GUI approach.

A scripting language such as MATLAB provides a higher level of abstraction for creating a design than does an HDL. A scripting language supports flexible parameterization through which, for example, components of a design may be easily scaled for different applications. However, scripting languages may be cumbersome for quickly assembling components of a circuit design. Other high-level programming languages such as JAVA™, JAVASCRIPT™, C++, and TCL (Tool Command Language), are also sometimes used to create circuit designs. However, developing circuit designs using these languages has the same drawbacks as using MATLAB.

A GUI-based modeling system allows a designer to easily abstract and assemble different parts of a design. However, for designs that contain hundreds to thousands of blocks, and for designs in which the number of blocks and connections change subject to design parameters, it may be more straightforward for the designer to specify the design and define the parameters that control the numbers of blocks and connections with a script-based specification rather than with a GUI-based system.

Furthermore, designs are often prepared with the collaboration of several designers preparing different components of the overall design. Different designers may use different design systems or design on different levels of abstraction. Because changes to one component can adversely affect the operation of others, it is desirable to compare and track changes between various design tools.

SUMMARY

In one of the various contemplated embodiments of the invention, a process is provided for detecting differences between high level block diagram models using text based analysis. First and second block diagram models are converted into respective first and second text based models. Differences between the first and second text based models are identified. Identified differences are then displayed.

In another embodiment of the invention, a system is provided for identifying and displaying differences between two block diagram models. The system includes a processor, a bus coupled to the processor, a memory unit coupled to the bus, and a storage unit coupled to the bus. The processor and the memory are configured to convert the block diagram models into respective first and second text based models. The processor and memory are further configured to identify differences between the first and second text-based models and display the identified differences.

In yet another of the various embodiments of the invention, an article of manufacture is provided. The article of manufacture is characterized by instructions which, when executed by a processor, cause the processor to convert first and second block diagram models into respective first and second text-based models. The executed instructions further cause the processor to identify differences between the first and second text-based models and store the identified differences.

It will be appreciated that various other embodiments are set forth in the Detailed Description and Claims, which follow.

DETAILED DESCRIPTION

The present invention increases interoperability and capabilities of existing circuit design environments, and achieves an advance in the art, by converting high level block diagram models to a user readable text-based format and performing a text-based differential analysis on the converted models. High level block diagram models are often encoded in special formats. These model files may contain information unrelated to the functionality of the designs, such as time stamps or formatting information for a diagram. The conversion of high level block diagram models to text based models places the compared models in a format in which the models can be compared for character differences without identifying character differences unrelated to the design functionality. In this manner, false positives identifying a block as changed when there has been no substantive functional change, are prevented. The conversion of the models into a common plaintext format further increases interoperability between designs that have been converted and modified in different models. In converting to text, the user is able to utilize inexpensive text-based solutions rather than more complex, high-level block diagram solutions. Additionally, the text conversion places the models to be viewed in a more user readable format. There is no need for users to install high level modeling systems in order to see the differences between the high level models.

Figure 1:
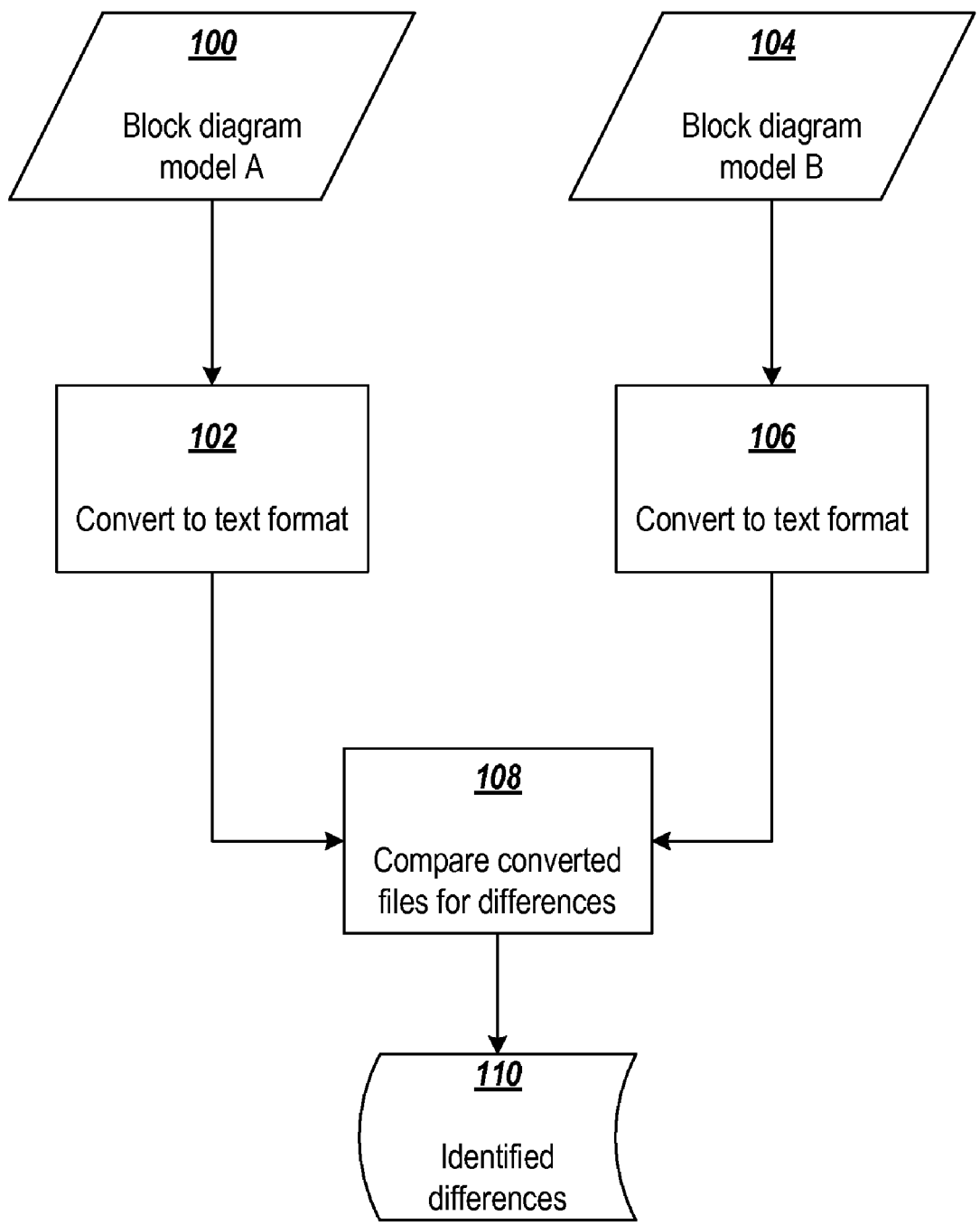
FIG. 1 illustrates a block diagram of the process of converting two models into a text-based format and identifying differences in accordance with several embodiments of the invention.

FIG. 1 shows a block diagram of the process of converting two models into a text-based format and identifying differences in accordance with several embodiments of the invention. The process takes two high level block diagram models 100 and 104 as input. Each model is converted into a text based format at steps 102 and 106. The converted models are compared for differences at step 108 and identified differences 110 are output in plain text format.

Various embodiments of the invention perform the conversion to a text-based format differently. For example, a high level block diagram model may be converted to an HDL such as Verilog, an HLL such as C or C++, a MATLAB script, or other plaintext representation of the circuit design.

Figure 2:
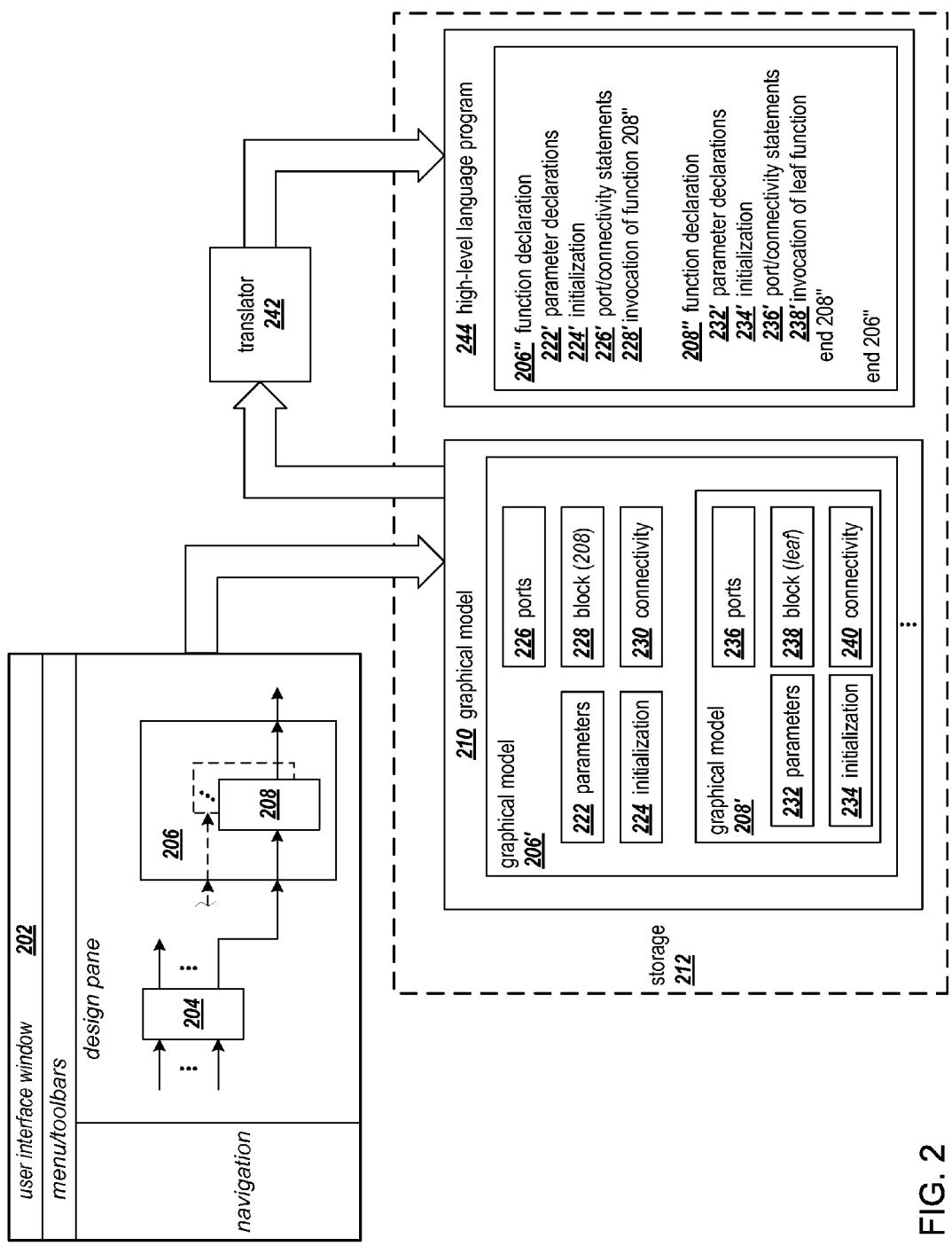
FIG. 2 illustrates a GUI interface and an example modularized circuit design which is translated from a high level block diagram model into a high level language program in accordance with various embodiments of the invention.

FIG. 2 shows a GUI interface and an example modularized circuit design outer subsystem and inner subsystem which are translated from a high level block diagram model into an HLL program. The example user interface window 202 includes a design pane in which a portion of an example electronic circuit design is displayed. The portion of the example design is shown as having graphical objects 204, 206, and 208. Graphical object 206 is used to illustrate the translation of an underlying graphical model into an HLL program.

In the description below, the following terminology is employed. A "graphical object" refers to the graphical rendering of a component of a design as displayed to a designer. An abstract view of the circuit design is that the design is comprised of functional or logic "blocks," each performing the designated function. A "graphical model" refers to the stored data that defines a block of the design in a high level block diagram model, including data for rendering a graphical object. The function of a block may be provided by one or more blocks nested within that block. If the details of the nested blocks are not important to the designer, the designer may choose to view the block containing the nested blocks without viewing the nested blocks. The term "outer subsystem" refers to a block that contains nested blocks, and each nested block may be an "inner subsystem" of the outer subsystem. A block is a subsystem if it contains any nested blocks, and a leaf block if it does not contain any nested blocks. "Block" may sometimes be used as shorthand to reference a graphical object, the underlying graphical model, a subsystem, or a leaf.

The graphical object 206 depicts an outer subsystem as defined by graphical model 206' in storage 212, and the graphical object(s) 208 depicts an inner subsystem as defined by the graphical model 208'. The graphical model 206' is part of graphical model 210, which includes other parts of the overall electronic circuit design. Each graphical model 206' and 208' includes a set of attributes that define the model. The attributes include parameters, initialization commands, ports, blocks, and connectivity. For graphical model 206', the attributes are shown as parameters 222, initialization commands 224, ports 226, blocks 228, and connectivity 230.

Parameter attributes 222 are used in configuring the graphical model 206'. For example, the parameter attributes may include variable names and values which are evaluated at the time the graphical model is compiled into a simulation model. Example parameters include values for constants used in the function specified by the graphical model.

The initialization attributes 224 include commands which are optionally established by a designer. The commands may be used to establish an initial state for the graphical model when that model is opened for simulation.

The ports attributes 226 specify characteristics of the ports of the block specified by the graphical model 206'. Such characteristics include the names and directions (input or output) of the ports.

The block attributes 228 specify each block that is nested within graphical model 206'. In the example, the block 206 is shown as including one or more blocks 208. The nested block 208 provides some part of the overall function of block 206. Thus, the block attributes 228 of graphical model 206' specify that block 208 is nested within block 206. It will be appreciated that graphical model 206' specifies that block 206 is an inner subsystem of the block defined by graphical model 210. Thus, the block (not shown) defined by graphical model 210 is an outer subsystem relative to block 206'.

The connectivity attributes 230 specify the connections between the blocks specified by the blocks attributes 228 as well as the connections to the ports specified by the ports attributes 226. Values for the parameters and the initialization commands may be specified by a designer using editing windows such as the examples shown in FIGS. 2 and 3.

Graphical model 208' specifies the attributes of block 208, which is nested within block 206. The nested relationship is shown as graphical model 208' being contained by graphical model 206'.

The graphical model 208' includes parameter attributes 232, initialization attributes 234, ports attributes 236, block attributes 238, and connectivity attributes 240 as described above for the graphical model 206'.

According to embodiments of the inventions, in response to a designer selecting a particular graphical model and invoking a translator 242, the selected graphical model is read from storage 212 and translated into an HLL program 244. The HLL may be a scripting language or a language for which program code is typically interpreted or compiled and executed. The generated HLL program 242 has a structure that corresponds to the hierarchical relationship between the components of the translated model. For example, the graphical model 206', which contains the graphical model 208', is translated into a function in the HLL program which begins with the function declaration 206". The function specification 206" includes parameter declarations 222' for the parameter attributes 222 of the graphical model 206', initialization statements 224' that implement the initialization commands 224, port and connectivity statements 226' that implement the port attributes 226 and connectivity attributes 230, and a statement 228' that invokes a function corresponding to the block 208, which is specified by the block attributes 228.

The graphical model 208' is translated into a function that is specified within the scope of function 206" in the HLL program 244. The specification of the function for graphical model 208' begins with the function declaration 208" and includes statements 232', 234', 236', and 238', which correspond to the attributes of graphical model 208 and are similar to the statements in function 206".

In the example program 244, function 208" is shown as being declared within the scope of function 206" by way of it being specified before the end 206" statement. Parameters referenced by function 206" can be referenced by function

208", which reflects the scope of parameter attributes 222 of graphical model 206' being visible within graphical model 208'.

The HLL program code in Example 1 below illustrates an example translation of a graphical model. The example code is a script in the MATLAB language. There are elements in the example script that correspond to code that would be generated from the graphical model 206' of FIG. 2. However, it will be recognized that the script in Example 1 reflects characteristics of a graphical model beyond those of graphical model 206'. In particular, the declared inner_subsystem invokes the xBlock function twice for instantiating two constant multipliers, with the output of the first constant multiplier connected to the input of the second constant multiplier.

```
function outer_subsystem(a, b)
    % initialization commands
    c=a+b;
    in =xInport('in');
    out=xOutport('out');
    xBlock(str2func('inner_subsystem'), {a, b});
    function inner_subsystem(a, b)
        % mask initialization
        d1=c*2+a;
        d2=c*3+b;
        in=xInport('in');
        out=xOutport('out');
        % create a signal object which can
        % connect two blocks
        sig=xSignal( );
        % create a const mult,
        % connect subsystem input port 'in'
        % to the input port of const mult
        % connect signal 'sig'
        % to the output port of const mult
        xBlock('Constant Multiplier', . . .
            {'const', d1}, . . .
            {in}, . . .
            {sig});
        % create another const mult 2,
        % connect signal 'sig'
        % to the input port of const mult 2
        % connect subsystem input port 'out'
        % with the output port of const mult
        xBlock('Constant Multiplier', . . .
            {'const', d2}, . . .
            {sig}, . . .
            {out});
    end % function inner_subsystem
end % function outer_subsystem
```

EXAMPLE 1

The outer_subsystem function corresponds to graphical model 206'. The inner_subsystem function is declared and defined within the definition of the outer_subsystem function (before the "end" statement for the outer_subsystem). Thus, the inner_subsystem function is nested within the outer_subsystem function, much as function 208" is nested within function 206" in FIG. 2, which allows the inner_subsystem function to reference parameters of the outer_subsystem function. For example, parameters a, b, and c, which are declared in the outer_subsystem function, are referenced in the inner_subsystem function.

For a scripting language, such as MATLAB, type declaration is not required for the variables. However, those skilled in the art will recognize that if the target HLL is strongly typed, as are C++ and Java, each variable would be declared with a type. In a strongly-typed language, the "in" in Example 1 would be declared as a type xInport, "out" would be declared as a type xOutport, "sig" would be declared as a type xSignal, and parameters a and b would be the type double. The types, xInport, xOutport, and xSignal would be custom defined for use in generating the desired model from the executed program.

The comments in the script designate the initialization commands for the outer_subsystem and for the inner_subsystem. The following statements:
```
in=xInport('in');
out=xOutport('out');
```
are generated from the port attributes of the graphical model. Note that the outer_subsystem and the inner_subsystem both have these port statements.

The statement, xBlock(str2func('inner_subsystem'), {a, b}); invokes the inner_subsystem function and is generated based on the block attributes of the graphical model of the outer_subsystem. That is, the block attributes of the outer_subsystem will identify the inner_subsystem as a constituent block of the outer_subsystem.

A block that does not contain any nested blocks is a leaf block, as noted above. The function that is specified for a leaf block is that which generates a graphical model of that same leaf block when that function is invoked in executing the HLL program. The following HLL statement from Example 1 is that generated from a leaf block in a graphical model:
```
xBlock('Constant Multiplier', . . .
    {'const', d1}, . . .
    {in}, . . .
    {sig});
```
When the xBlock function is called with values for the specified parameters, the output is a graphical model for the constant multiplier block. Thus, the predefined xBlock function instantiates a leaf block in the graphical model, with the leaf block being a constant multiplier as specified with the parameter to xBlock. The xBlock function is programmed to generate a graphical model that is compliant with the underlying graphical modeling system, for example, SIMULINK.

Based on the connectivity attributes of the graphical model corresponding to the inner_subsystem function, the function is specified with a statement to instantiate the signal (sig=xSignal( )). The signal named sig, connects the output of the first constant multiplier to an input of the second constant multiplier, where the constant multipliers are instantiated with the calls to xBlock('Constant Multiplier', . . . .

The generated HLL program is distinguished from the graphical model in that the graphical model does not support parameterization of the model by way of adding programmatic control flow. For example, the script in Example 1 could be supplemented with a for loop which contains the xBlock ('Constant Multiplier', . . . ) statement, where the for loop iterates some number of times based on an input parameter value. When the supplemented script is executed with the parameter value of the for loop, a chain of constant multipliers is instantiated in the design. Whereas, with the GUI interface the designer would have to manually instantiate and connect the desired number constant multipliers in the chain, with the supplemented script the designer need only input the desired parameter value.

Figure 3:
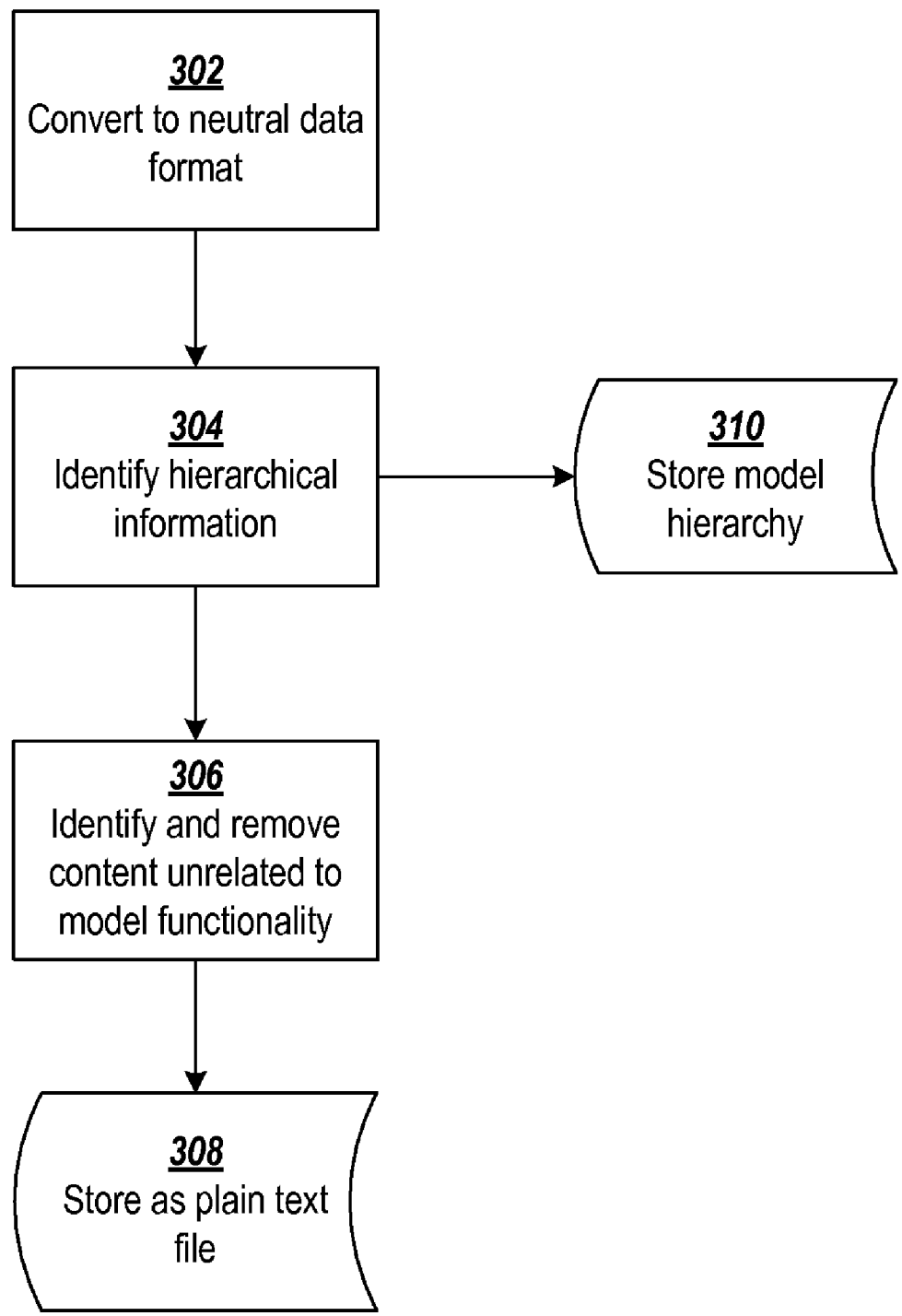
FIG. 3 illustrates a block diagram of a second process of converting a high level block diagram model into a user readable text format in accordance with various embodiments of the invention.

In converting a high level block diagram model into a plain-text format, several embodiments of the present invention increase user readability of the converted file by removing operations and objects that are non-functional. FIG. 3 illustrates a flowchart of an example process for converting a high level block diagram model into a user readable text format in accordance with various embodiments of the invention. An input model is first converted to a text-based format at step 302. Hierarchical information of the model is identified at step 304 and stored in a file 310 for later use. Those skilled in the art will understand that hierarchical information can be preserved in a variety of ways. The hierarchy information can be saved in a separate file or can be saved in the same file 308 used to store the converted plain text format of the model. Non-functional information is then identified and removed from converted file at step 306 and resulting file 308 is stored. High level block diagram models include information used by the specific modeling environment that is unrelated to the functionality of the design, such as the creation time, creator of the model, display formatting, etc.

Removal of non-functional information from the model not only increases user readability, it further allows a text based differential analysis to identify changes without including superfluous formatting changes that do not affect the operation of the circuit design.

Figure 4:
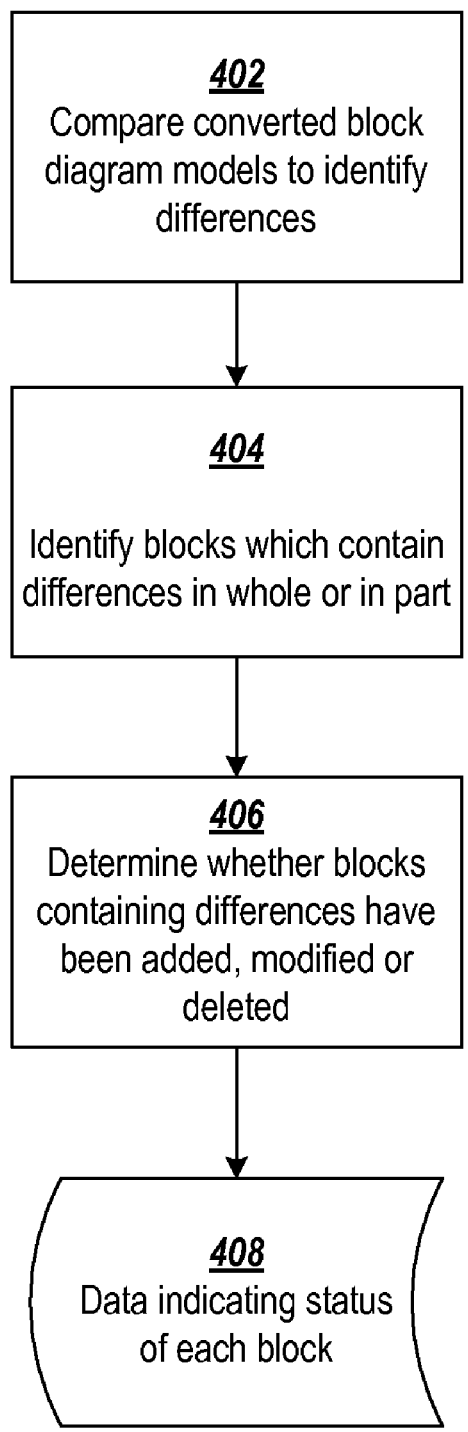
FIG. 4 illustrates a block diagram of the process of comparing two models to identify differences and determine whether a module has been added, deleted, or modified in accordance with various embodiments of the invention.

To aid designers in the tracking and debugging of circuit design model changes, various embodiments of the invention distinguish block module changes displayed to the user. Changes to a block module show the block module has either: added in whole, deleted in whole, or modified in part. FIG. 4 shows a block diagram of the process of comparing two models to identify differences and determine whether a module has been added, deleted, or modified. Two models are first compared for differences at step 402. Identified differences are correlated with specific block modules at step 404. At step 406, block modules are analyzed to determine whether each module has been added, deleted, or modified. This status information 408 is then stored for later use.

Figure 5:
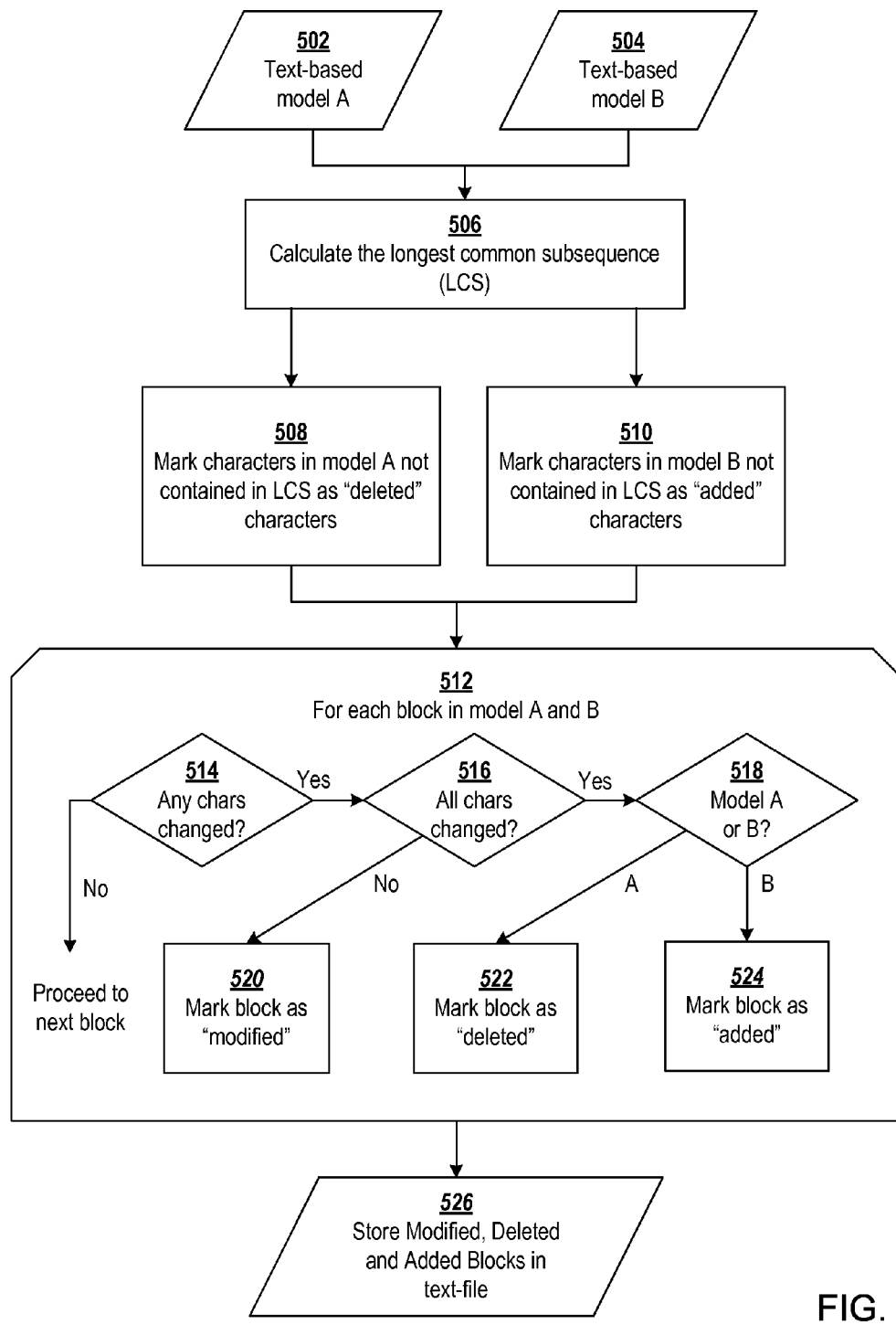
FIG. 5 illustrates, as an example, an implementation of the difference calculation in accordance with various embodiments of the invention.

Those skilled in the art will recognize that differences can be detected and identified at step 402 using a variety of difference algorithms. FIG. 5 shows, as an example, an implementation of the difference calculation in accordance with various embodiments of the invention. Specific differences can be identified by calculating the longest common subsequence (LCS) at step 506 of the two plain text models, 502 and 504, and comparing the LCS with each file to determine whether characters have been added, deleted, or remain unchanged at steps 508 and 510. If characters from model A are not contained in the LCS, characters are marked as being deleted at step 508. If characters from model B are not contained in the LCS, characters are marked as being added at step 510. Individual blocks from models A and B are then analyzed to determine whether the block has been added-in-whole, deleted-in-whole, or modified-in-part at step 512.

For each block, if decision step 514 finds no characters marked as added or deleted, the block has not been changed and is not marked. If decision block 514 finds a block contains a change and decision step 516 finds that not all characters of the block have changed, the block is marked as modified at step 520. If decision step 516 finds that all characters of a block have been changed and decision step 518 finds the changes are from model A, the block is marked as deleted at step 522. If decision step 518 finds the changes are from model B, the block is marked as added at step 524. Blocks marked as added, deleted, or modified are then stored as a plain text file 526.

Alternatively, blocks may be first identified and difference comparison can then be performed on per block basis. To increase efficiency, various implementations may calculate a hash of each block or subsequences to determine whether the blocks or subsequences are identical. Those skilled in the art will recognize that difference comparison can be implemented using text-based difference tools such as: cmp, comm, diff, diff3, Kompare, Meld, rsync, tkdiff, winMerge, etc.

The following code segment in Example 2 shows the generated output of the comparison process when implemented by the UNIX difference utility diff3. In this example, the two Simulink™ models were compared to generate the shown output. The models were identical in all respects except a block "xlsub3_addr_counter" was added to the second model. In comparing the models, Diff3 generated the following:

```
+% generated from Simulink block:myexample_systems/
    address_generator/ . . .
+xlsub3_addrcounter=xBlock(struct('source',
    'Counter', . . .
+ struct('cnt_to', PI_ADDR_RANGE, . . .
+ 'n_bits', PI_ADDR_WIDTH, . . .
+ load_pin', 'on', . . .
+ 'en', 'on', . . .
+ 'use_rpm', 'off'), . . .
+ (xlsub3_register4_out1, . . .
+ xlsub3_slice2_out1, . . .
+ xlsub3_logixal5_out1), . . .
+ {xlsub3_addr_counter_out1});
```

EXAMPLE 2

In example 2, all lines of the "xlsub2_addr_counter" block are preceded by "+" to indicate each line has been added. Likewise, if an entire block was deleted, all lines of the block would be preceded by '−' to indicate each line had been deleted. If the block shown in example 2 was modified to change the parameter 'en' to 'off' and compared with the block as shown, diff3 would generate the following:

```
. % generated from Simulink block:myexample_systems/
    address_generator/ . . .
.
.           xlsub3_addrcounter=xBlock(struct('source',
    'Counter', . . .
. struct('cnt_to', PI_ADDR_RANGE, . . .
. 'n_bits', PI_ADDR_WIDTH, . . .
. 'load_pin', 'on', . . .
− 'en', 'on', . . .
+ 'en', 'off', . . .
. 'use_rpm', 'off'), . . .
. (xlsub3_register4_out1, . . .
. xlsub3_slice2_out1, . . .
. xlsub3_logixal5_out1), . . .
. {xlsub3_addr_counter_out1});
```

In this case the line "'en', 'on'" is preceded by a '−' to indicate it has been deleted and replaced by "'en', 'off'." Because different portions of this block are identified with both added and deleted lines, the whole block is identified as modified.

Text-based tools can also be used for other included features such as merging or patching. Merging is useful to combine independent changes together in a single file. For example, consider an original circuit design model A which contains two block modules. The first module of model A is modified by one designer and saved as circuit design model B. The second module of model A is modified by a second designer and saved as circuit design model C. Merging identifies the differences between model A and B and then incorporates these differences into model C. Using the same example, patching identifies the differences between models A and B and creates an executable that can convert other targeted copies of model A into model B.

Figure 6:
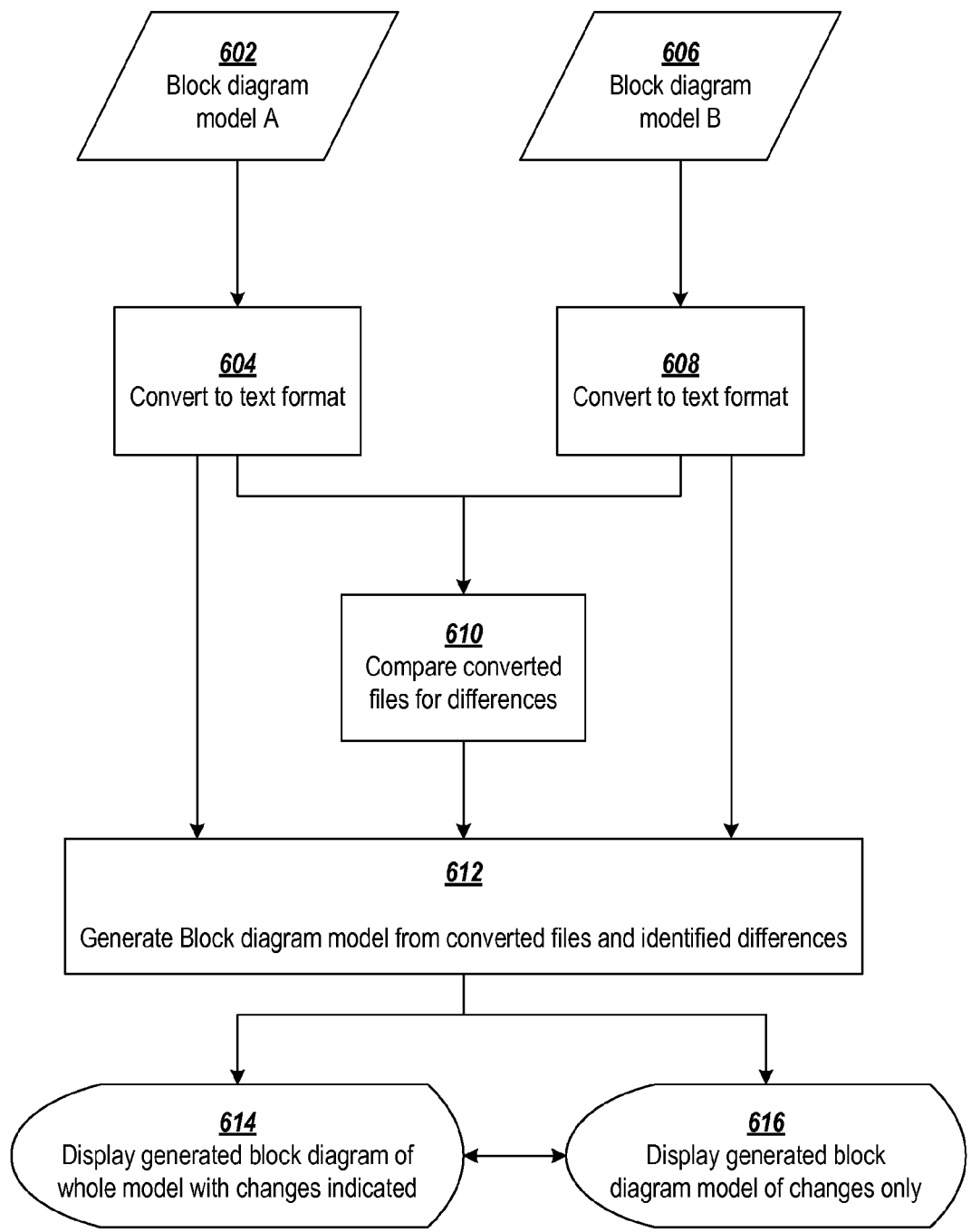
FIG. 6 illustrates a block diagram of the process of converting two models into a text-based format, identifying differences, and displaying differences as a high level block diagram in accordance with various embodiments of the invention.

FIG. 6 shows a flowchart of an example process of converting two models into a text-based format, identifying differences between them, and displaying the differences as a high level block diagram. The process takes two high level block diagram models as input, 602 and 606. Each model is converted into a text based format at steps 604 and 608. The converted models are compared for differences at 610. The process is similar to that in FIG. 1, except the identified differences are used to generate a high level block diagram model 612 which is displayed to the user at steps 614 and 616. If the hierarchy of the models is preserved as in FIG. 4, the hierarchy is used to generate the graphical display model 612. Otherwise, the text-based model must be parsed to determine hierarchy of each block (not shown). After the model is generated, the whole model may be displayed with changed blocks indicated as added, deleted, or modified at step 614, or changed blocks may be displayed separate from the entire model at step 616. The additions, deletions, and modifications may be delineated with different block colors or shading, for example.

Figure 7:
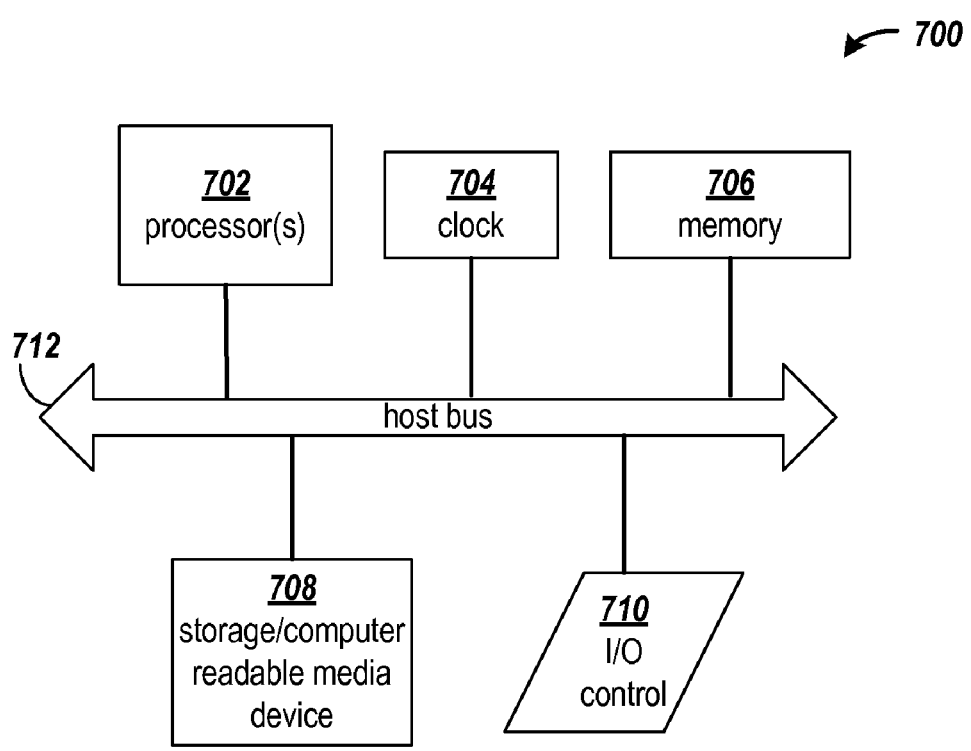
FIG. 7 illustrates a block diagram of a general purpose processor computing arrangement for implementing a difference utility in accordance with various embodiments of the invention.

FIG. 7 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of the different embodiments of the present invention. The computer code comprising the processes of the present invention, encoded in a processor executable format, may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory unit 706, a storage unit 708, and an input/output control unit 710, all coupled to host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements, as would be recognized by those skilled in the art. The processor 702 may be one or more general purpose processors, or a combination of one or more general purpose processors and suitable co-processors, or one or more specialized processors (e.g., RISC, CISC, pipelined, etc.), for example.

The memory arrangement 706 typically includes multiple levels of cache memory, and a main memory. The storage arrangement 708 may include local and/or remote persistent storage such as provided by magnetic disks (not shown), flash, EPROM, or other non-volatile data storage. The storage unit may be read or read/write capable. Further, the memory 706 and storage 708 may be combined in a single arrangement.

The processor arrangement 702 executes the software in storage 708 and/or memory 706 arrangements, reads data from and stores data to the storage 708 and/or memory 706 arrangements, and communicates with external devices through the input/output control arrangement 710. These functions are synchronized by the clock signal generator 704. The resources of the computing arrangement may be managed by either an operating system (not shown), or a hardware control unit (not shown).

The present invention is thought to be applicable to a variety of systems for detecting differences between high level block diagram models. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of detecting differences between high level block diagram models using text based analysis, comprising:
    converting a first block diagram-based model and a second block diagram-based model to a first text-based model and a second text-based model, respectively;
    on a processor, identifying differences between the first text-based model and the second text-based model;
    merging identified differences into a third block diagram model which has been converted to a plain text format; and
    displaying the identified differences on a graphical user interface.

2. The method of claim 1, further comprising indentifying blocks of text within the first and second text-based models which correspond to blocks of the high level block diagram-based model.

3. The method of claim 2, further comprising:
    identifying each block that has been added, modified, or deleted; and
    storing data indicating each block that has been added, modified, or deleted.

4. The method of claim 3, wherein the converting includes preserving in the first and second text-based models, hierarchical relationships between blocks as specified in the first and second block diagram-based models.

5. The method of claim 4, further comprising:
    generating a block diagram from the first and second text-based models of blocks identified as added, modified, or deleted; and
    displaying the generated block diagram in a manner that graphically indicates each block that has been added, modified, or deleted.

6. The method of claim 4, further comprising:
    generating a block diagram from the first and second text-based models; and
    displaying the generated block diagram in a manner that graphically indicates each block that has been added, modified, or deleted.

7. The method of claim 1, wherein the text-based model converted to is a hardware description language based model.

8. The method of claim 1, wherein the identifying of differences comprises:
    determining a longest common subsequence of characters in the first text-based model and the second text-based model; and
    identifying portions of the first and second text-based models that are not part of the longest common subsequence.

9. The method of claim 1, further comprising: converting merged file to a high-level block diagram format.

10. A system for identifying and displaying differences between two block diagram models, comprising:
    a processor;
    a bus coupled to the processor;
    a memory unit coupled to the bus; and
    a storage unit coupled to the bus;
    wherein the processor and the memory are configured to:

convert the block diagram models to respective first and second text-based models;

identify differences between the first and second text-based models;

merge identified differences into a third block diagram model which has been converted to a plain text format; and display the identified differences on a graphical user interface.

11. The method of claim 10, wherein the processor and the memory are further configured to: indentify blocks of text within the first and second text-based models which correspond to blocks of the high level block diagram-based model.

12. The method of claim 11, wherein the processor and the memory are further configured to:

identify each block that has been added, modified, or deleted; and store data indicating each block that has been added, modified, or deleted.

13. An article of manufacture, comprising:

a processor-readable non-transitory storage medium configured with processor-executable instructions, the instructions when executed by a processor causing the processor to:

convert first and second block diagram models into respective first and second text-based models;

identify differences between the first and second text-based models;

merge identified differences into a third block diagram model which has been converted to a plain text format; and store the identified differences in an electronic storage device.

14. The article of manufacture of claim 13, wherein the instructions further cause the processor to:

indentify blocks of text within the first and second text-based models which correspond to blocks of the high level block diagram-based model.

15. The article of manufacture of claim 13, wherein the instructions further cause the processor to:

identify each block that has been added, modified, or deleted; and store data indicating each block that has been added, modified, or deleted.

16. The article of manufacture of claim 13, wherein the instructions further cause the processor to:

determine a longest common subsequence of characters in the first text-based model and the second text-based model; and identify portions of the first and second text-based models that are not part of the longest common subsequence.

\* \* \* \* \*